(12) United States Patent
Chen et al.

(10) Patent No.: US 7,367,694 B2
(45) Date of Patent: May 6, 2008

(54) PROJECTOR AND LAMP HOUSING THEREOF

(75) Inventors: Chien-Fu Chen, Taipei County (TW); Don Liang, Taoyuan County (TW)

(73) Assignee: Prodisc Technology Inc., Taipei Hsien (TW)

( * ) Notice: Subject to any disclaimer, the term of this patent is extended or adjusted under 35 U.S.C. 154(b) by 72 days.

(21) Appl. No.: 10/995,256

(22) Filed: Nov. 24, 2004

(65) Prior Publication Data
US 2006/0028826 A1    Feb. 9, 2006

(30) Foreign Application Priority Data
Aug. 4, 2004    (TW) .............................. 93123282 A

(51) Int. Cl.
*F21V 29/00*    (2006.01)
(52) U.S. Cl. ...................... 362/373; 362/296; 362/294; 362/547; 362/345; 362/264
(58) Field of Classification Search ................ 362/373, 362/547, 294, 342, 345, 264, 296; 353/57, 353/61, 85, 98; 313/24, 13, 113
See application file for complete search history.

(56) References Cited

U.S. PATENT DOCUMENTS

| | | | |
|---|---|---|---|
| 6,004,010 A | * | 12/1999 | Inage et al. .................. 362/294 |
| 6,435,699 B2 | | 8/2002 | Glowach, Sr. et al. |
| 6,494,581 B2 | | 12/2002 | Shimizu |
| 6,498,423 B1 | * | 12/2002 | Bell et al. ...................... 313/24 |

FOREIGN PATENT DOCUMENTS

JP    3718577 A1 * 12/1988

* cited by examiner

*Primary Examiner*—Sharon E. Payne
(74) *Attorney, Agent, or Firm*—Birch, Stewart, Kolasch & Birch, LLP

(57) ABSTRACT

A lamp housing for a projector is for accommodating at least a lamp, and a heat-dissipating fan disposed at one side of the lamp housing. The lamp housing includes a housing body, and a baffle plate. In this case, the housing body has a first opening, and the wind blown by the heat-dissipating fan flows from the first opening into the housing body. The baffle plate is disposed between the housing body and the lamp. The baffle plate and the direction of the wind blown by the heat-dissipating fan form an included angle.

16 Claims, 4 Drawing Sheets

PROJECTOR AND LAMP HOUSING THEREOF

BACKGROUND OF THE INVENTION

1. Field of Invention

The invention relates to a lamp housing and, in particular, to a lamp housing for projectors.

2. Related Art

With rapid development in technologies, projectors have been widely used in various fields, from consumption products to high-tech products and even beyond. For example, they are used for projective exhibition in large-size conferences. They are also used in commercial projection screens or televisions. Therefore, immediate pictorial presentations can be made in reports.

Generally speaking, to ensure highly brightness and clear images onto a screen, high-power lamps are often used as the light source. To protect the fragile lamp of the projector from breaking, the lamp is often disposed inside a lamp housing. As consumers prefer more compact devices, projectors are also made smaller. The result is that the lamp inside the lamp housing faces the problem of difficult heat dissipation.

As shown in FIG. 1, the conventional projector lamp housing 10 accommodates a lamp 11. One side of the lamp housing 10 disposed has a heat-dissipating fan 12, and the other side has an opening 13 to circulate hot air. The lamp 11 consists of a lamp core 111 and a conic lampshade 112 surrounding the lamp core 111. Wind blown out from the heat-dissipating fan 12 flows toward the surface of the lampshade 112 to lower the temperature inside the lamp housing 10.

As shown in FIGS. 1 and 2, the air flow analysis inside the project lamp housing 10 shows that the air blown by the heat-dissipating fan 12 forms a turbulent region W on the lee side of the lampshade 112 after passing the lampshade 112. The air inside the turbulent almost does not flow. Therefore, there is barely any effect on heat dissipation on the lee side of the lamp 11. Moreover, there is an obvious temperature difference between the lee side and the wind-facing side of the lamp 11. The larger the turbulent region W is, the larger high-temperature area the lamp 11 has. The most significant consequence is shortening the life-span of the lamp 11. Therefore, how to evenly distribute wind blown out from the heat-dissipating fan 12 around the lamp 11 for improving heat dissipation and ensuring the lamp quality has always been an important issue in the industry.

SUMMARY OF THE INVENTION

In view of the foregoing, the invention provides a projector and a lamp housing that can evenly distribute wind blown out from the heat-dissipating fan.

An objective of the invention is to provide a projector and the lamp housing thereof, so that the wind blown by the heat-dissipating fan can be more evenly distributed, thereby enhancing the heat dissipation efficiency of the lamp.

To achieve the above objective, the disclosed projector includes a housing body, at least one lamp, a heat-dissipating fan, and at least one baffle plate. The housing body has a first opening. The lamp is accommodated inside the housing body. The heat-dissipating fan is disposed on one side of the housing body. Wind blown out from the heat-dissipating fan enters the housing body via the first opening. The baffle plate is disposed between the housing body and the lamp. The baffle plate and the flowing direction of the wind blown by the heat-dissipating fan form an included angle.

Moreover, to achieve the above objective, the disclosed lamp housing is used to accommodate at least a lamp. A heat-dissipating fan is disposed on one side of the projector lamp housing. The projector lamp housing includes a housing body at least one baffle plate. The housing body has a first opening. Wind blown out from the heat-dissipating fan enters the housing body via the first opening. The baffle plate is disposed between the housing body and the lamp. The baffle plate and the flowing direction of the wind blown by the heat-dissipating fan form an included angle.

As described above, the disclosed projector and its lamp housing have at least one baffle plate to change the flowing direction of the wind blown by the heat-dissipating fan. In comparison with the prior art, the disclosed projector and the lamp housing thereof have the baffle plate disposed between the housing body and the lamp, so that the baffle plate and the flowing direction of the wind blown by the heat-dissipating fan form an included angle to change the wind flowing direction. Therefore, more airflow is formed on the back of the lamp, enhancing the homogeneity of heat dissipation around the lamp. In this case, the lamp can operate under an appropriate working temperature without overheating or inhomogeneous temperature distribution. As a result, the product quality can be increased to elongate its lifetime.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
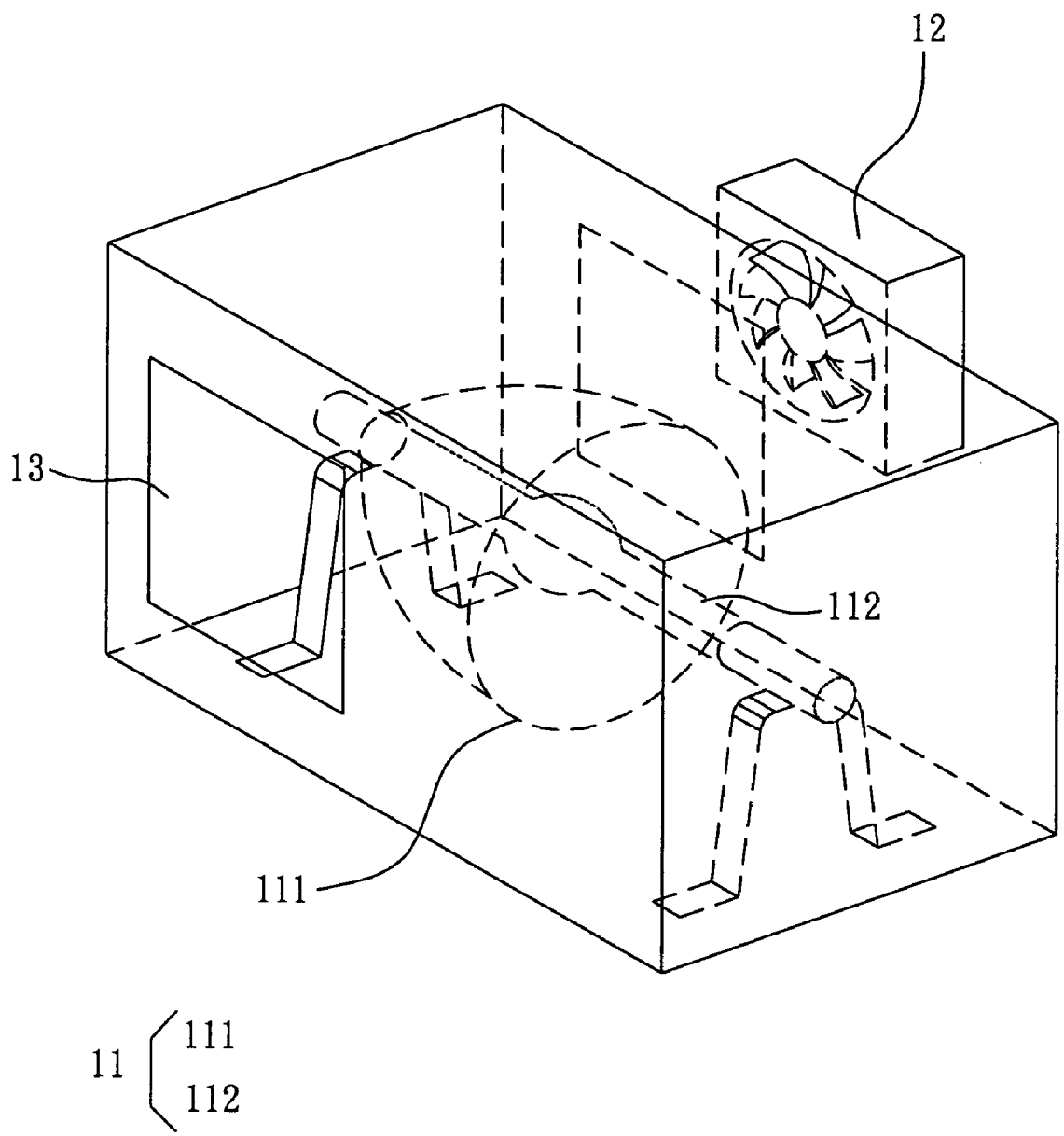
FIG. 1 is a schematic view of a conventional projector lamp housing.
Figure 2:
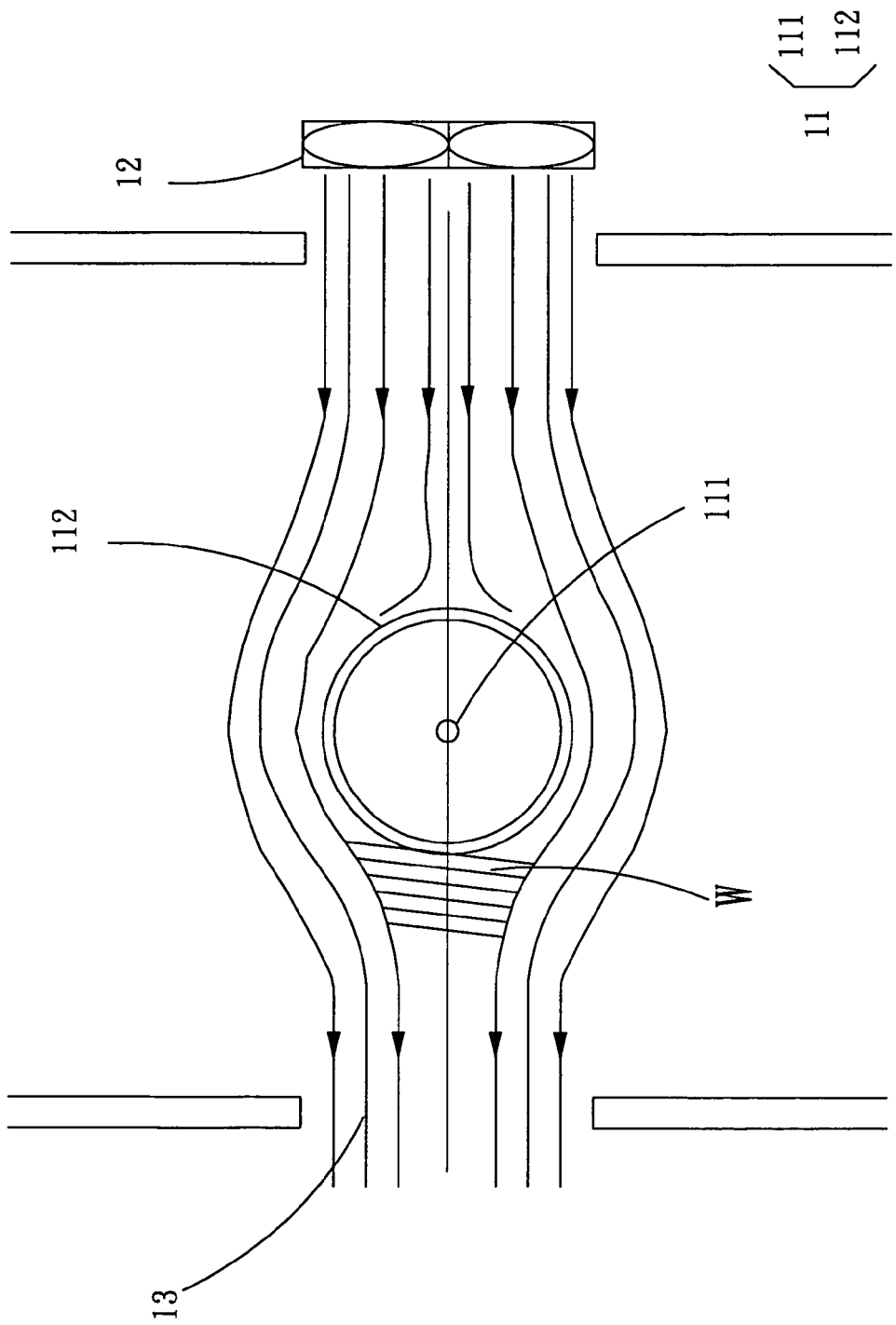
FIG. 2 is a schematic view of the air flow analysis inside the conventional projector lamp housing.
Figure 3:
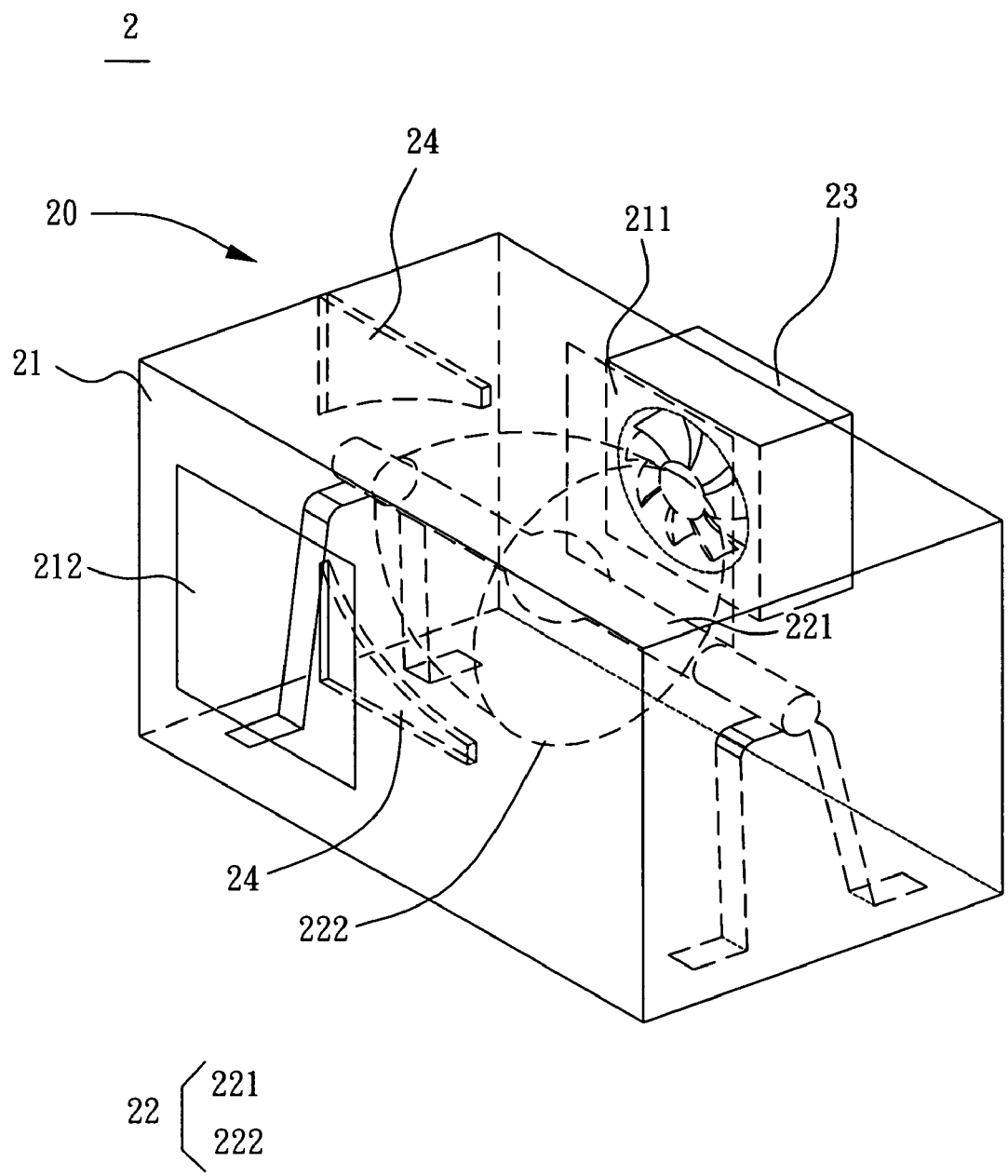
FIG. 3 is a schematic view of the projector of the invention.
Figure 4:
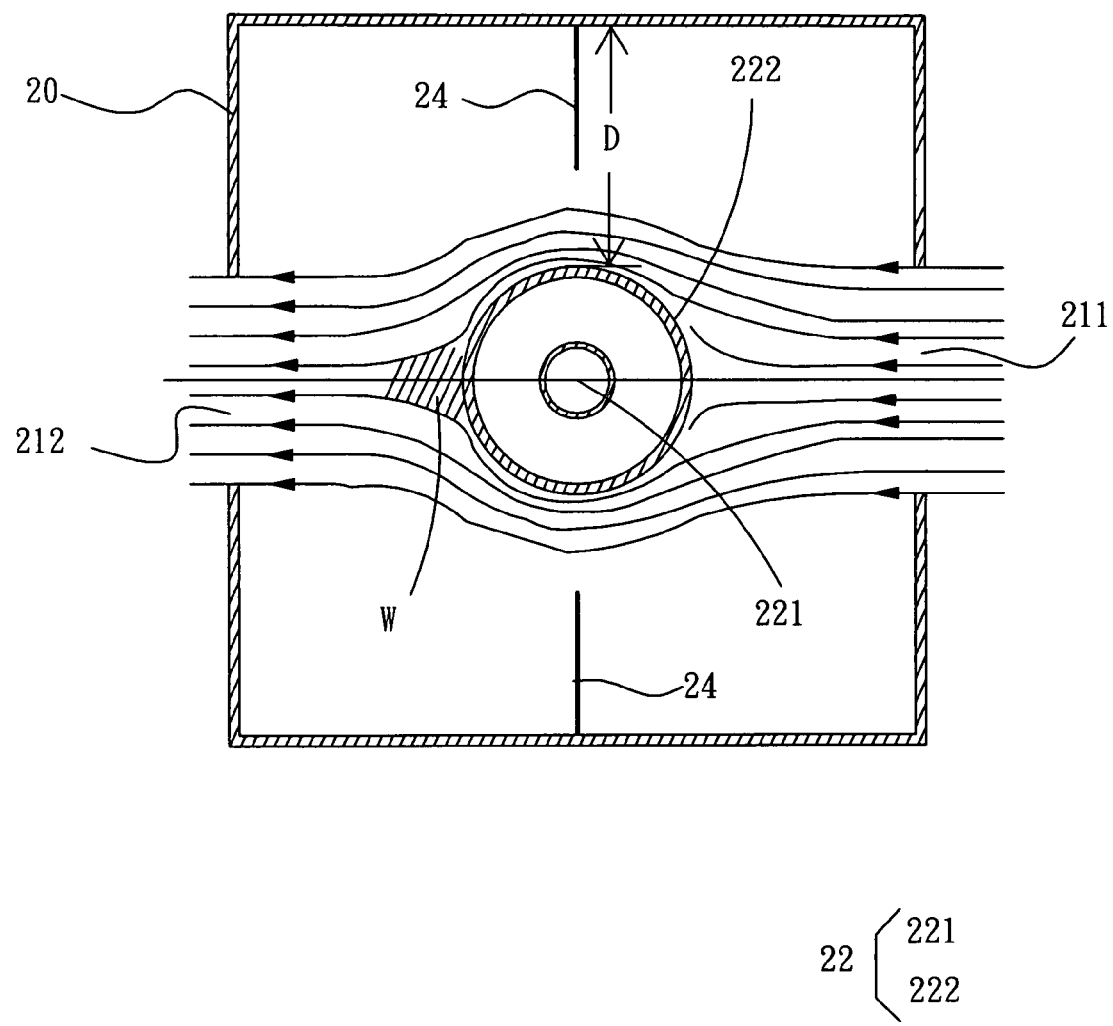
FIG. 4 is a schematic view of the air flow analysis inside the projector lamp housing of the invention.

First, FIG. 3 and FIG. 4 show a preferred embodiment of the projector of the invention.

As shown in FIG. 3, the projector 2 includes a housing body 21, at least one lamp 22, a heat-dissipating fan 23, and at least one baffle plate 24. It should be noted that the projector 2 may have two or more lamps 22.

The housing body 21 has a first opening 211. The lamp 22 is accommodated inside the housing body 21 to prevent it from breaking. In addition, the housing body 21 can have a second opening 212 for the wind blown by the heat-dissipating fan to flow away the housing body 21.

The lamp 22 has a lampcore 221 and a lampshade 222. The lampcore 221 emits highly bright light. The lampshade 222 surrounds the lampcore 221 and has a conic or cylindrical shape. The lampshade 222 shields some of the light emitted by the lampcore 221, so that the lampcore 221 can emit more convergent light. However, also because the lampshade 222 shields some of the light, the temperature of the lampshade 222 rises with time as a result of the radiation. In this embodiment, the lampshade 222 has a conic shape and the lampcore 211 is disposed inside the lampshade 222. Moreover, a highly reflective layer can be formed on the inner surface of the lampshade 222 by electroplating or coating, which can reflect light emitted by the lampcore 221 and increase the brightness.

The heat-dissipating fan 23 is disposed on one side of the housing body. The heat-dissipating fan 23 is used to help the lamp 22 dissipating heat. The wind blown out from the heat-dissipating fan 23 enters the housing body 21 via the first opening 211 then reach the lampshade 222. The wind leaves the housing body 21 via the second opening 212. Therefore, the temperature of the lamp 22 can be decreased.

As shown in FIG. 4, the baffle plate 24 is disposed between the housing body 21 and the lamp 22 for changing the path of the wind blown out from the heat-dissipating fan 23. Thus, the turbulent region W on the lee side of the lampshade 222 becomes smaller. The baffle plate 24 and the flowing direction of the wind blown by the heat-dissipating fan 23 form an included angle. In this embodiment, two baffle plates 24 are disposed on the housing body and integrally formed with the housing body 21. Each of the baffle plates 24 and the flowing direction of the wind blown by the heat-dissipating fan 23 form an included angle of about 90 degrees. Of course, one may use only one baffle plate 24. The angle formed by the baffle plate 24 and the flowing direction of the wind blown by the heat-dissipating fan 23 may be another value, as long as the wind flowing direction can be changed by the baffle plate 24.

With further reference to FIG. 3 and FIG. 4, an interval D is formed between the housing body 21 and the lamp 22. The baffle plate 24 is disposed between the housing body 21 and the lamp 22, so that the distance between the baffle plate 24 and the lamp 22 is smaller than interval D. Because of the block of the baffle plate 24 and the small interval D, the wind blown by the heat-dissipating fan 23 changes its flowing direction as it passes between the lampshade 222 and the housing body 21. The density of the air flow around the lampshade 222 increases in such a way that the turbulent region W on the lee side of the lampshade 222 becomes smaller. As a result, the air flow on the wind-facing side and the lee side of the lampshade 222 become similar to each other.

We further use FIG. 3 and FIG. 4 to explain a preferred embodiment of the projector lamp housing of the invention.

As shown in FIG. 3, the lamp housing 20 is used to accommodate at least one lamp 22. A heat-dissipating fan 23 is disposed on one side of the lamp housing 20. The lamp housing 20 includes a housing body 21 and at least one baffle plate 24. In this case, the housing body 21, the lamp 22, the heat-dissipating fan 23, and the baffle plate 24 together form the disclosed projector 2 of the invention. It should be noted that the disclosed lamp housing 20 can accommodate two or more lamps 22.

The housing body 21 has a first opening 211. The lamp 22 is accommodated inside the housing body 21 to prevent the lamp 22 from breaking due to external forces. In addition, the housing body has a second opening 212 according to the current embodiment. The wind blown out from the heat-dissipating fan 23 flows away the housing body 21 via the second opening 212.

The lamp 22 has a lampcore 221 and a lampshade 222. The lampcore 221 emits highly bright light. The lampshade 222 surrounds the lampcore 221 and has a conic or cylindrical shape. The lampshade 222 shields some of the light emitted by the lampcore 221, so that the lampcore 221 can emit more convergent light. However, also because the lampshade 222 blocks some of the light, the temperature of the lampshade 222 rises with time as a result of the radiation. In this embodiment, the lampshade 222 has a conic shape and the lampcore 211 is disposed inside the lampshade 222. Moreover, a highly reflective layer can be formed on the inner surface of the lampshade 222 by electroplating or coating, which can reflect light emitted by the lampcore 221 and increase the brightness.

The heat-dissipating fan 23 is disposed on one side of the housing body. The heat-dissipating fan 23 is used to help the lamp 22 dissipating heat. The wind blown out from the heat-dissipating fan 23 enters the housing body 21 via the first opening 211 then reach the lampshade 222. It leaves the housing body 21 via the second opening 212. Therefore, the temperature of the lamp 22 can be decreased.

As shown in FIG. 4, the baffle plate 24 is disposed between the housing body 21 and the lamp 22 to change the path of the wind blown out from the heat-dissipating fan 23. Thus, the turbulent region W on the back side of the lampshade 222 becomes smaller. The baffle plate 24 and the flowing direction of the wind blown by the heat-dissipating fan 23 form an included angle. In this embodiment, two baffle plates 24 are disposed on the housing body and formed together with the housing body 21. Each of the baffle plates 24 and the flowing direction of the wind blown by the heat-dissipating fan 23 form an included angle of about 90 degrees. Of course, one may use only one baffle plate 24. The angle between the baffle plate 24 and the heat-dissipating fan 23 may be another value, as long as the wind flowing direction can be changed.

With further reference to FIG. 4, the housing body 21 and the lamp 22 are separated by an interval D. The baffle plate 24 is disposed between the housing body 21 and the lamp 22, so that the distance between the baffle plate 24 and the lamp 22 is smaller than interval D. Because of the block of the baffle plate 24 and the small interval D, the wind blown by the heat-dissipating fan 23 changes its flowing direction as it passes between the lampshade 222 and the housing body 21. The density of the air flow around the lampshade 222 increases in such a way that the turbulent region W on the back of the lampshade 222 becomes smaller. As a result, the air flow on the wind-facing side and the lee side of the lampshade 222 become similar to each other.

In summary, the projector and the lamp housing thereof of the invention include at least one baffle plate to change the flowing direction of the wind blown by the heat-dissipating fan. In compared with the prior art, the baffle plate of the invention is disposed between the housing body and the lamp so that the baffle plate and the flowing direction of the wind blown by the heat-dissipating fan form an included angle to change the airflow direction. More air flows at the lee side of the lamp, which enhance heat dissipation of the lamp. Therefore, the lamp works at a proper temperature without the problem of overheating. By improving the quality of the product in this way, its life span becomes longer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projector lamp housing for accommodating at least one lamp and a heat-dissipating fan disposed on one side of the lamp housing, wherein the lamp has a lampcore and a lampshade surrounding the lampcore, the lamp housing comprising:

a housing body, which has a first opening where the wind blown out from the heat-dissipating fan enters the housing body and flows along the outer surface of the lampshade; and a plurality of baffle plates, which are disposed inside the housing body and in pairs at opposite sides of the lampshade, mounted on said housing body and substantially separate the wind facing side and lee side of the lampshade, wherein the baffle plate and the flowing direction of the wind blown by the heat-dissipating fan form included angles, wherein an interval is formed between the baffle plate and the lamp.

2. The projector lamp housing of claim 1, wherein the wind blown by the heat-dissipating fan flows toward the lampshade via the first opening.

3. The projector lamp housing of claim 1, wherein the housing body further has a second opening where the wind blown by the heat-dissipating fan flows away from the housing body.

4. The projector lamp housing of claim 1, wherein the included angle is 90 degrees.

5. The projector lamp housing of claim 1, wherein an interval is formed between the housing body and the lamp, the baffle plate is disposed between the housing body and the lamp, and the distance between the baffle plate and the lamp is smaller than the interval.

6. The projector lamp housing of claim 1, wherein the baffle plates and the housing body are integrally formed.

7. The projector lamp housing of claim 1, wherein the baffle plates cause the path of the wind blown by the heat dissipating fan to be changed so that a turbulent region on the lee side of the lampshade is reduced.

8. A projector, comprising:

a housing body, which has a first opening;

at least one lamp, which is accommodated inside the housing body and has a lampcore and lampshade surrounding the lampcore;

a heat-dissipating fan, which is disposed on one side of the housing body and blows wind into the housing body via the first opening; and a plurality of baffle plates, which are disposed inside the housing body and in pairs at opposite sides of the lampshade, mounted on said housing body and substantially separate the wind facing side and the lee side of the lampshade, wherein the baffle plate and the wind blown by the heat-dissipating fan form included angles, wherein an interval is formed between the baffle plate and the lamp.

9. The projector of claim 8, wherein the wind blown by the heat-dissipating fan flows toward the lampshade via the first opening.

10. The projector of claim 8, wherein the housing body further has a second opening where the wind blown by the heat-dissipating fan flows away from the housing body.

11. The projector of claim 8, wherein the included angle is 90 degrees.

12. The projector of claim 8, wherein an interval is formed between the housing body and the lamp, the baffle plate is disposed between the housing body and the lamp, and the distance between the baffle plate and the lamp is smaller than the interval.

13. The projector of claim 8, wherein the baffle plates and the housing body are integrally formed.

14. The projector lamp housing of claim 8, wherein the baffle plates cause the path of the wind blown by the heat dissipating fan to be changed so that a turbulent region on the lee side of the lampshade is reduced.

15. A projector lamp housing for accommodating at least one lamp and a heat-dissipating fan disposed on one side of the lamp housing, wherein the lamp has a lampcore and a lampshade surrounding the lampcore, the lamp housing comprising:

a housing body, which has a first opening where the wind blown out from the heat-dissipating fan enters the housing body and flows along the outer surface of the lampshade; and a plurality of baffle plates, which are disposed inside the housing body, attached at the same surface of the housing body and in pairs at opposite sides of the lampshade, wherein the baffle plate and the flowing direction of the wind blown by the heat dissipating fan form included angles, wherein an interval is formed between the baffle plate and the lamp.

16. The projector lamp housing of claim 15, wherein the baffle plates cause the path of the wind blown by the heat dissipating fan to be changed so that a turbulent region the lee side of the lampshade is reduced.

* * * * *